United States Patent [19]

Yoda et al.

[11] Patent Number: 4,773,993
[45] Date of Patent: Sep. 27, 1988

[54] APPARATUS FOR PURIFYING AND DISPENSING WATER WITH STAGNATION PREVENTING MEANS

[75] Inventors: Hiroaki Yoda, Ibaraki; Minoru Kuroiwa, Abiko; Yoshitsugu Itoh, Kashiwa, all of Japan

[73] Assignee: Hitachi, Ltd., Tokyo, Japan

[21] Appl. No.: 22,881

[22] Filed: Mar. 6, 1987

Related U.S. Application Data

[63] Continuation of Ser. No. 768,314, Aug. 22, 1985, abandoned.

[30] Foreign Application Priority Data

Aug. 31, 1984 [JP] Japan ................................ 59-180610

[51] Int. Cl.$^4$ ............................................ B01D 13/00
[52] U.S. Cl. .................................. 210/136; 210/195.2; 210/321.69
[58] Field of Search .................... 210/136, 137, 195.2, 210/257.2, 295, 321.1, 433.2, 900, 321.69

[56] References Cited

U.S. PATENT DOCUMENTS

| | | | |
|---|---|---|---|
| 3,276,458 | 10/1966 | Iversen et al. | 210/900 X |
| 3,472,765 | 10/1969 | Budd et al. | 210/433.2 |
| 4,246,101 | 1/1981 | Selby | 210/615 |
| 4,342,651 | 8/1982 | Ahrens | 210/636 |
| 4,528,093 | 7/1985 | Winer | 210/96.2 |
| 4,610,790 | 9/1986 | Reti et al. | 210/636 |

OTHER PUBLICATIONS

Sourirajan, S., *Reverse Osmosi*, Academic Press, N.Y., 1970, pp. 465-467.

*Primary Examiner*—Frank Spear
*Attorney, Agent, or Firm*—Antonelli, Terry & Wands

[57] ABSTRACT

An apparatus for producing pure water from raw water, comprises a reverse osmotic membrane unit, a polisher, an ultraviolet sterilizer, a high pressure pump for forcing raw water to flow through a reverse osmotic membrane in said reverse osmotic membrane unit to produce pure water permeated therethrough, and for feeding pure water to a use point, and a circulating line extending between said use point and a suction side of said high pressure pump for circulating pure water therebetween. With this construction, degradation of pure water due to stagnation is avoided.

4 Claims, 1 Drawing Sheet

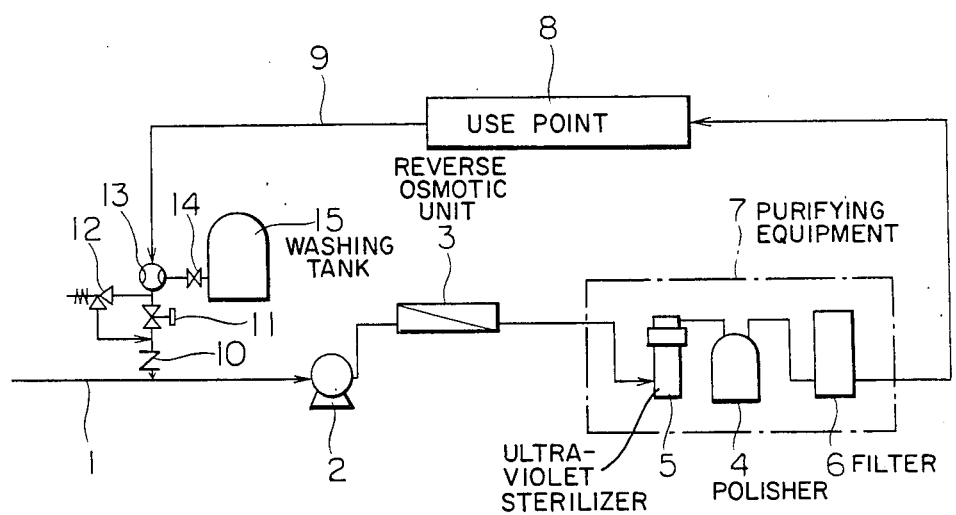

APPARATUS FOR PURIFYING AND DISPENSING WATER WITH STAGNATION PREVENTING MEANS

This is a continuation of application Ser. No. 768,314, filed Aug. 22, 1985, now abandoned.

BACKGROUND OF THE INVENTION

The present invention relates to an apparatus for producing pure water, and, more particularly, to an apparatus suitable for pharmaceutical and semiconductor industries.

Water of high purity is required in the pharmaceutical industry for manufacturing drugs and medicines as well as in the electronic industry for manufacturing semiconductor devices. For instance, in the manufacture of minute semiconductor devices, such as integrated circuits (I.C.) or large scale integrated circuits (L.S.I.), the purity of washing water is directly related to the quality of the products. Accordingly, the high purification of water is of great concern.

In a conventional pure water producing apparatus, raw water is fed through a raw water supply line into a first intermediate tank for temporary storage. Then the raw water is supplied by a high pressure pump to a reverse osmotic or semipermeable membrane in a reverse osmotic unit at a pressure above the osmotic pressure for removing salt. Permeated water which has been desalted by the reverse osmotic unit flows through a permeated water line and is stored into a second intermediate tank having a free liquid level. The permeated water is stored not only to prevent the semipermeable membrane in the reverse osmotic unit from being damaged due to a closed operation, but also to purge the free liquid level with an inert gas such as nitrogen, thereby maintaining desirable qualities of water. Concentrated water produced in the reverse osmotic unit is discharged therefrom through a concentrated water line. The permeated water in the second intermediate tank is forced by a pure water pump to flow through a purifying equipment which comprises a polisher, an ultraviolet sterilizer, a filter or the like, and thence the water so treated is fed to a use point where it is consumed as washing water. Unused treated pure water is returned to the second intermediate tank through a circulating line. By the circulating line, the unused pure water is successively circulated through the second intermediate tank, the purifying equipment, and the use point for preventing degradation of water. According to such a conventional apparatus, water can be degraded due to the existence of two intermediate tanks. For instance, if a small amount of bacteria would leak in such tanks, they would proliferate resulting in a contamination of the inside of the tanks by a huge amount of bacteria. Since the reverse osmotic unit is out of operation while pure water is being unused in the use point, the semipermeable membrane is subjected to an intensive contamination. The semipermeable membrane thus contaminated must be washed frequently. To wash the semipermeable membrane, a washing liquid tank and a washing liquid pump are disposed out of the main treatment line for circulating a washing liquid through the semipermeable membrane.

The foregoing apparatus is described in MEMBRANE APPLICATION TECHNOLOGY HANDBOOK, published by Saiwai Shobo on July 15, 1983, P191 "Reverse Osmotic Membrane, Ultrafiltration II, Application".

An object of the present invention is to provide an apparatus for producing pure water which eliminates the need for intermediate tanks which would otherwise degrade pure water, thereby preventing degradation of pure water due to stagnation thereof.

According to the present invention, an apparatus for producing pure water from raw water, comprises a reverse osmotic membrane unit, a polisher, an ultraviolet sterilizer, a high pressure pump for forcing raw water to flow through a reverse osmotic membrane in reverse osmotic membrane unit to produce pure water permeated therethrough, and for feeding pure water to a use point, or consumer and a circulating line extending between the use point or consumer and a suction side of the high pressure pump for circulating pure water therebetween, whereby a technical measure for preventing degradation of pure water caused by stagnation is realized.

BRIEF DESCRIPTION OF THE DRAWINGS

The single FIGURE is a schematic view of a pure water producing apparatus constructed according to the present invention.

DETAILED DESCRIPTION

The present invention is described herein below in detail in conjunction with an embodiment thereof with reference to the accompanying drawing.

Raw water is introduced through a raw water supply line 1 into a high pressure pump 2 which, in turn, feeds raw water to a reverse osmotic or semi-permeable membrane in a reverse osmotic unit 3 at a pressure above the osmotic pressure for removing salt. Desalted permeated water is then supplied to a purifying equipment 7 which comprises a polisher 4, an ultraviolet sterilizer 5, a filter 6 or the like. Then treated pure water is fed from the purifying equipment 7 to a use point 8 where it is consumed as washing water. The remaining or unused pure water is returned through a circulating line 9 to a suction side of the high pressure pump 2. The high pressure pump 2 is operated continuously even when pure water is not consumed at the use point or consumer 8. A check valve 10 is disposed between the circulating line 9 and the raw water supply line 1 upstream of the suction side of the high pressure pump 2 so as to prevent raw water from flowing into the circulating line 9. A manually operated opening and closing valve 11 is disposed in the circulating line 9 to close this line when the apparatus is out of operation, thereby preventing raw water from diffusing into pure water in the circulating line 9. A relief valve 12 is disposed parallel to the valve 11. Operation of the apparatus begins with the valve 11 closed and continues for a certain period of time and, upon expiration of this period, the valve 11 is opened. During the starting period of time, pure water is returned from the circulating line 9 to the suction side of the high pressure pump 2 via the relief valve 12 so that a closed operation of the reverse osmotic membrane unit 3 is avoided. Disposed in the circulating line 9 upstream of the valve 11 is an ejector 13 connected with a washing liquid tank 15 via an opening and closing valve 14. The whole lines of the apparatus are to be washed, the valve 14 is actuated to open whereupon a washing liquid is forced by the ejector 13 to flow into the circulating line 9, thence the washing liquid is circulated into the line 9 through the high pressure pump 2, the reverse osmotic unit 3 and the purifying equipment 7.

Although in the illustrated embodiment, the ejector 13 is used to feed the washing liquid from the washing liquid tank 15 to the circulating line 9, a head of the washing liquid in the tank 15 may be utilized.

As described above, according to the present invention, raw water is forced by a high pressure pump to flow through a reverse osmotic membrane for producing pure water permeated therethrough, which is then circulated through a circulating line so as to pass through the use point and then to return to a suction side of the high pressure pump. Thus, it is possible to prevent degradation of pure water due to stagnation thereof.

What is claimed is:

1. An apparatus for producing pure water from raw water, the apparatus comprising: a reverse osmotic membrane means; a purifying means connected to said reverse osmotic membrane means, said purifying means including a polisher and an ultraviolet sterilizer; a high pressure pump means having a suction side and a discharge side, said high pressure pump means having its discharge side connected to said reverse osmotic membrane means for forcing raw water to flow through a reverse osmotic membrane in said reverse osmotic membrane means to produce pure water permeated therethrough and for feeding said pure water through said purifying means and to a use point where the pure water can be used; and a circulating line means extending between said use point and the suction side of said high pressure pump means for circulating unused pure water from said use point to the suction side of said high pressure pump means for recirculation through said apparatus without storage in a tank.

2. An apparatus according to claim 1, further comprising a check valve means disposed in said circulating line means for preventing raw water from flowing backward into said circulating line means.

3. An apparatus according to claim 1, further comprising an opening and closing valve means disposed in said circulating line means, and a relief valve means disposed in parallel to said opening and closing valve means, said opening and closing valve being closed when said apparatus is brought into operation.

4. An apparatus according to claim 1, further comprising an ejector means disposed in said circulating line means and a washing liquid tank means connected with said ejector means for supplying a washing liquid through said ejector means into said circulating line

* * * * *